United States Patent [19]

Yamamoto et al.

[11] Patent Number: 4,738,602

[45] Date of Patent: Apr. 19, 1988

[54] METHOD FOR MANUFACTURING AN APEX SEAL FOR A ROTARY PISTON ENGINE USING HIGH ENERGY HEATING RADIATION

[75] Inventors: Junichi Yamamoto; Yoshifumi Yamamoto; Katsuya Ohuchi; Tsutomu Shimizu, all of Hiroshima, Japan

[73] Assignee: Mazda Motor Corporation, Hiroshima, Japan

[21] Appl. No.: 938,080

[22] Filed: Dec. 4, 1986

[30] Foreign Application Priority Data

Dec. 6, 1985 [JP] Japan .................. 60-275616

[51] Int. Cl.⁴ ............... F01C 19/02; F01C 1/22
[52] U.S. Cl. ................... 418/113; 418/152; 418/178; 29/156.4 R; 29/557; 29/DIG. 13; 29/DIG. 24; 219/121 EK; 219/121 PE; 219/121 PH; 219/121 LJ; 219/121 LN
[58] Field of Search ............. 418/61 A, 113, 152, 418/178, 179; 29/156.4 R, 557, 558, DIG. 13, DIG. 24; 219/121 PC, 121 PD, 121 PE, 121 PH, 121 LG, 121 LH, 121 LJ, 121 LN, 121 EH, 121 EJ, 121 EK; 428/141, 446, 698

[56] References Cited

U.S. PATENT DOCUMENTS

B 318,515  5/1967  Jones .................. 418/178
3,658,451  4/1972  Gomada .............. 418/178

FOREIGN PATENT DOCUMENTS 0097490  6/1983  Japan ............. 219/121 LN
0073189  4/1984  Japan ............. 219/121 LJ
1477636  6/1977  United Kingdom ...... 418/152

Primary Examiner—John J. Vrablik
Assistant Examiner—Leonard P. Walnoha
Attorney, Agent, or Firm—Fleit, Jacobson, Cohn & Price

[57] ABSTRACT

A method for manufacturing an apex seal for a rotary piston engine comprising steps of preparing an apex seal blank made of ceramic material, and applying a high energy heating radiation to the sliding surface of the apex seal blank to form a roughened and porous structure on the surface portion of the apex seal blank. The high energy heating radiation is desirably applied to the apex seal blank under a non-oxidizing atmosphere so that an oxidization of the components of the ceramic material can be prevented.

9 Claims, 3 Drawing Sheets

METHOD FOR MANUFACTURING AN APEX SEAL FOR A ROTARY PISTON ENGINE USING HIGH ENERGY HEATING RADIATION

BACKGROUND OF THE INVENTION

1. Field of the Invention

The present invention relates to apex seals for rotary piston engines, more particularly to an apex seal of ceramic material and an improved method for manufacturing the apex seal.

2. Description of the Prior Art

In the field of rotary piston engines, conventionally it has been known that a cast iron is chilled to form a hardened structure on the surface portion by applying an electronic beam as disclosed in U.S. Pat. No. 3,658,451. Such chilled cast iron has an excellent sliding property or wear resistance so that an apex seal of the chilled cast iron can match with trochoidal surface a rotor housing coated with Cr plating.

Recently, the rotary piston engine is required to produce a high power output causing an increase of heat load and temperature in the combustion chamber. Therefore it has been sought for the apex seal and trochoidal surface materials with a sufficient wear and heat resistance to threreby meet such high power output rotary piston engine.

Meanwhile, in the operation of the rotary piston engine, it takes a certain period until the apex seal wears to get to fit to the trochodal surface of the rotor housing. Therefore, in the initial stage of the operation of the rotary piston engine, there may occur an undesirable phenomenon, such as a reduction of compressed gas pressure in the combustion chamber resulting from poor fit property of the apex seal to the surface of the rotor housing. In order to improve the initial fit property between the sliding surface of the apex seal and the trochoidal surface of the rotor housing to thereby eliminate the above phenomenon, it has been proposed to apply a shot blasting treatment by carbon particles on the sliding surface of the apex seal so as to obtain a certain roughness in the sliding surface of the apex seal made of a hardened cast iron, so called chilled structure cast iron.

SUMMARY OF THE INVENTION

It is therefore an object of the present invention to provide an apex seal for rotary piston engines and a method for manufacturing the same which can obtain an improved initial fit property of the apex seal to the trochoidal surface of the rotor housing.

It is another object of the present invention to provide an apex seal for rotary piston engines and a method for manufacturing the same which can improve the heat and wear resistances of the apex seal so as to meet with requirements in such a high power engine that the temperature, heat load and pressure are increased in the combustion chamber.

According to the present invention, there is provided an apex seal for rotary piston engines manufactured by means of a method comprising steps of preparing an apex seal blank made of ceramic material, and applying a high energy heating radiation to the sliding surface of the apex seal blank to form a roughened and porous sructure on the surface.

As the ceramic materials, nitride base fine ceramic materials, such as $Si_3N_4$, Sialon or the like and carbide base fine ceramic materials such as SiC or the like can be employed.

As the high energy heating radiations, a laser and an electronic beam can be employed. It is preferable to radiate the high energy heating radiations to the sliding surface of the apex seal blank in a non-oxidizing atmosphere such as Ar or $CO_2$.

According to the present invention, when the high energy heating radiations are applied to the sliding surface of the apex seal blank, the ceramic material on the apex seal blank is melted to be decomposed, and partly vaporized to thereby form a roughened and porous structure on the sliding surface of the apex seal blank.

The apex seal obtained by means of the present invention has an excellent intial fit property wherein the sliding surface of the apex seal wears effectively in the initial stage of the operation of the engine so as to get to fit to the trochoidal surface of the rotor housing so that the pressure drop in the combustion chamber can be minimized to produce a high power output even in the intial stage of the operation of the engine.

DESCRIPTION OF THE PREFERRED EMBODIMENTS

Hereinafter there is a detailed description of preferred embodiments of the present invention.

Figure 1:
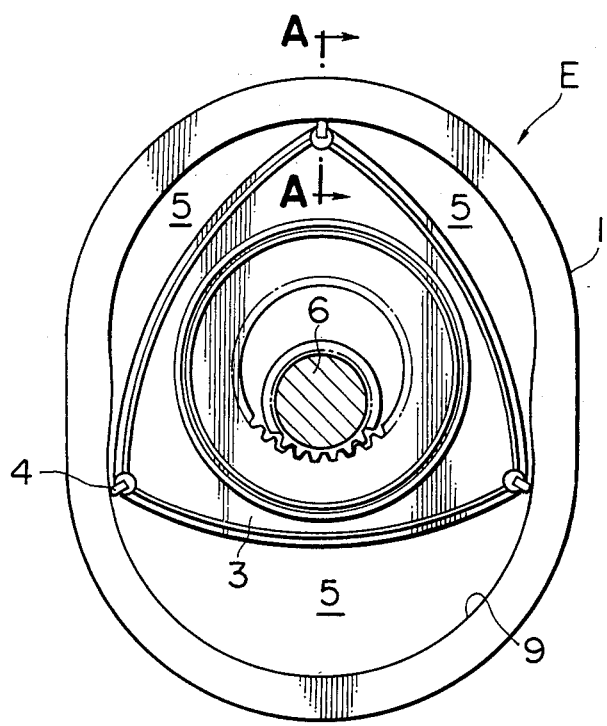
FIG. 1 is an end view of a part of a rotary piston engine in accordance with the present invention.
Figure 2:
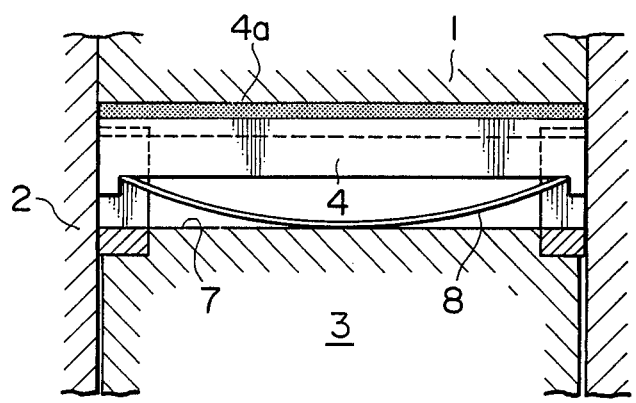
FIG. 2 is a sectional view of the rotary piston engine taken by a line A—A of the FIG. 1.

Referring to FIG. 1 and FIG. 2, a rotary piston engine E is provided with a rotor housing 1, a side housing 2 and a rotor 3 disposed in the space defined by the rotor housing 1 and side housing 2. The rotor 3 is provided with three apex seals 4 at the corners thereof. There are formed three operating chambers 5 defined by the rotor housing 1, side housing 2 and the rotor 3. The rotor 3 is rotatably engaged with an output shaft 6 so as to rotate eccentrically around the output shaft 6 to thereby perform intake, compression, explosion and exhaust steps.

The apex seal 4, as shown in FIG. 2, is mounted in a seal groove formed on the corner portion of the rotor 3 wherein the apex seal is urged against a trochoidal surface 9 of the rotor housing 1 by means of a spring 8 so that the sliding surface 4a of the apex seal 4 is brought into a slidably and airtightly contact with the trochoidal surface 9 of the rotor housing 1.

The rotor housing 1 is made of an aluminum alloy of which the trochoidal surface 9 is covered with a flame sprayed layer of $Cr_3C_2$ in thickness of 0.10 to 0.15, and a roughness of the surface Ra of 0.2 micron in order to improve the wear resistance.

It is preferrable that the apex seal 4 has an excellent heat impact resistance, wear resistance, strength and toughness in high temperature condition because the heat load, and heat impact are increased in a high power engine. For this purpose, the apex seal 4 is constituted by a fine ceramic material, $Si_3N_4$. It will be therefore understood that both the apex seal of $Si_3N_4$ and the trochoidal surface 9 covered with the flame sprayed layer of $Cr_3C_2$ have an improved hardness so that they are difficult to get to fit to each other at the beginning of operation of the engine causing a compressed gas pressure drop in the combustion chamber to thereby affect the power output of the engine.

Under these circumstances, according to the present invention, a laser is applied to the sliding surface 4a of the apex seal 4 to obtain a certain roughness thereon.

Hereinafter, there is described a method for manufacturing the apex seal 4.

First of all, $Si_3N_4$ powder of 96wt% as a fine ceramic material, MgO powder of 2wt% as a sintering assist material and CeO powder of 2 wt% were mixed. Thereafter, the mixture was sintered to form a general shape of the apex seal 4 by means of a conventional sintering means, such as a hot press, hot isostatic press, and normal pressure sintering processes where the pressure was 200 kg/cm², the temperature was 1750° C. and the sintering period was 2 hours.

The sintered material was in turn abraded by employing a diamond grinding wheel (#400-grit, diamond concentration index 100).

The surface roughness Ra of the material was 0.2 micron to 0.5 micron after the abrasion process.

Figure 3:
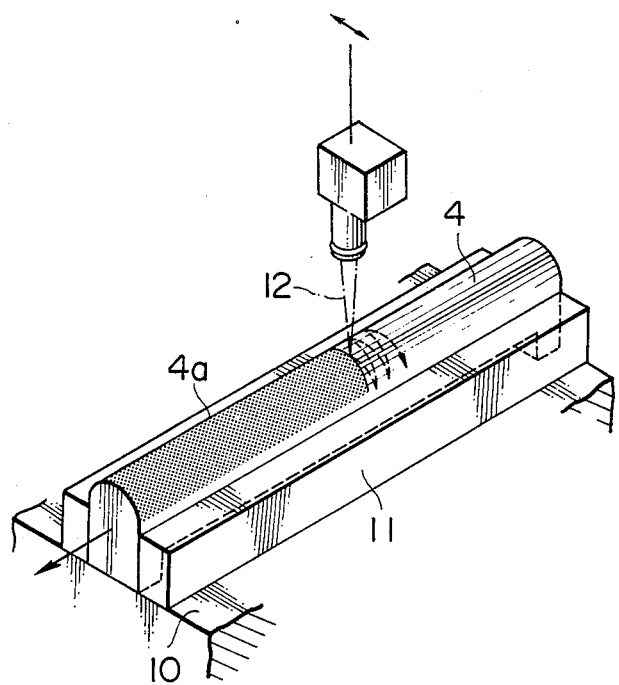
FIG. 3 is a perspective illustration showing a laser being applied to an apex seal blank in accordance with the present invention.
Figure 4:
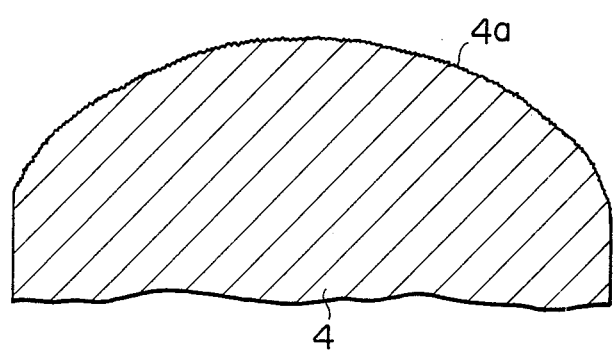
FIG. 4 is an enlarged sectional view of an apex seal in accordance with the present invention.

Thereafter the apex seal blank 4 was held by a fixture 11 mounted on a movable base 10 with the sliding surface 4a upward as shown in FIG. 3. A laser 12 was applied to the surface 4a of the apex seal blank 4 as the apex seal blank 4 moved in the longitudinal direction thereof so as to form a roughened surface across the sliding surface thereof by scanning the laser in the lateral direction of apex seal blank 4.

In this embodiment, a laser of $CO_2$ of 0.7 KW was employed to form a beam of 0.2 mm to 0.3 mm in size, supplying Ar gas as an assist gas around the beam to form a non-oxidizing atmosphere. The moving speed of the apex seal blank was 1 m/min. The scanning width was 3 mm with frequency of the scanning of 150 Hz.

The heat energy produced by the laser is adjusted to heat the apex seal blank to a temperature between 1700° C. at which $Si_3N_4$ is decomposed and 2680° C. of boiling point of Si when $Si_3N_4$ is employed for the apex seal blank.

In the case where the laser 12 is applied to the apex seal blank under the non-oxidizing atmosphere of Ar or $CO_2$, a part of Si liberates from $Si_3N_4$ to form a soft metal layer of Si on the sliding surface 4a so that the initial fit property of the apex seal 4 to the trochoidal surface of the rotor housing 1 can be improved.

As described above, when the converged laser 12 is applied throughout the sliding surface 4a of the apex seal blank, a surface portion of the apex seal of $Si_3N_4$ is fused to be decomposed and partly vaporized because of the heat energy of the laser to thereby form a porous structure in the surface portion of the apex seal blank having a certain surface roughness. In this embodiment, the apex seal has a surface roughness Ra of 1.1 micron.

In order to evaluate the initial fit propery of the apex seal, plural apex seal samples were tested. The test was carried out in the manner that a rotary piston engine incorporating the apex seal samples performs a certain test cycle in which the engine in one test cycle is operated at an engine speed of 1500 rpm at first, then at 7000 rpm for full load, and finally at 1500 rpm, and a gas pressure in the operating chamber 5 is measured when the test cycle is repeated by three times. It takes 1 minute for one test cycle.

Figure 5:
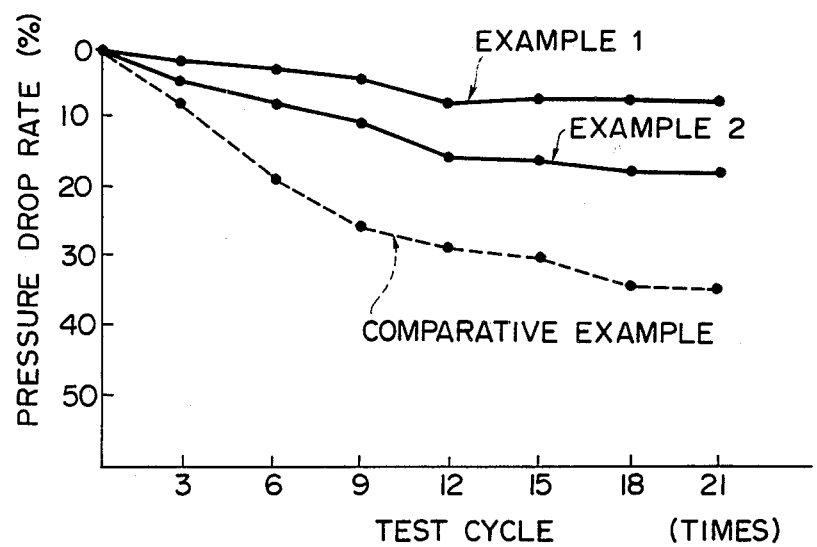
FIG. 5 is a diagrammatical view showing a relationship between the number of test cycles applied to a rotary piston engine incorporating test pieces of various apex seals and a compression pressure drop efficiency in a combustion chamber of the engine.

FIG. 5 shows results of the aforementioned test. Table 1 shows the surface roughness and the gas pressure drop rate after 21 test cycles are performed with regard to examples 1, and 2 according to the present invention and a comparative example according to a conventional method wherein an abrasion process is applied to the apex seal blank without application of any heating radiation.

TABLE 1

|  | Output of laser | Roughness Ra | Pressure drop rate |
|---|---|---|---|
| Example 1 | 1.0 KW | 2.9 Micron | 8% |
| Example 2 | 0.7 KW | 1.1 Micron | 17% |
| Comparative Example | — | 0.2 Micron | 28% |

It will be understood that the apex seal according to the present invention improves the initial fit property in reference with FIG. 5 and Table 1. This means that in the case where laser 12 is applied to the sliding surface 4a, the surface is roughened resulting in an increase of pressure and shearing force acted on the surface 4a when the surface is brought into sliding contact with the trochoidal surface 9 of the rotor housing so that the surface 4 wears to get to fit to the trochoidal surface 9 promptly. Accordingly to the test result, it is preferrable to adjust the output of the laser to 1.0 KW. In the case of the comparative example, the pressure drop is too high to use.

Though the embodiment is described with regard to $Si_3N_4$ based apex seal, it should be noted that the present invention can be applied for various fine ceramic, other than $Si_3N_4$, such as nitride or carbide base apex seal so as to form a porous structure on the sliding surface by applying the laser 12 as well. In order to obtain the roughened and porous structure on the sliding surface of the apex seal, an electronic beam can be employed instead of the laser.

According to the present invention, a roughened and porous structure is formed on the sliding surface by means of simple radiation of heating energy so that the initial fit property of the apex seal, thus the engine power output property is greatly improved.

We claim:

1. A method for manufacturing an apex seal for rotary piston engine wherein the method comprises steps of preparing an apex seal blank made of $Si_3N_4$, and applying a high energy heating radiation to the sliding surface of the apex seal blank to form a roughened and porous structure of Si on the surface portion of the apex seal blank.

2. A method in accordance with claim 1 in which the heating energy radiation is a laser.

3. A method in accordance with claim 1 in which the heating energy radiation is an electronic beam.

4. A method in accordance with claim 1 in which the heating energy radiation is applied under a non-oxidizing atmosphere.

5. A method in accordance with claim 4 in which the non-oxidizing atmosphere is prepared by Ar gas.

6. A method in accordance with claim 4 in which the non-oxidizing atmonsphere is prepared by $CO_2$.

7. An apex seal for rotary piston engine made of $Si_3N_4$ having a roughened and porous structure formed on the sliding surface thereof wherein the roughened and porous structure is constituted by Si.

8. A rotary piston engine comprising at least one rotor housing, at least two side housings, at least one rotor disposed in a space defined by the rotor housing and side housings, and apex seals mounted on corners of the rotor brought into sliding contact with a trochoidal surface of the rotor housing wherein the apex seal is made of $Si_3N_4$ and provided with a roughened and porous structure of Si formed on the sliding surface thereof by applying a high energy heating radiation thereto.

9. A rotary piston engine in accordance with claim 8 in which the rotor housing is formed with a flame sprayed layer of $Cr_2C_2$ on the trochoidal surface.

* * * * *